United States Patent [19]

Ibbott

[11] Patent Number: 5,480,522
[45] Date of Patent: Jan. 2, 1996

[54] SELF-ENERGIZING FLUID TREATMENT APPARATUS EMPLOYING EXTERNAL ELECTRODES

[75] Inventor: Jack K. Ibbott, Tokyo, Japan

[73] Assignee: Makiko Yoshida, Tokyo, Japan

[21] Appl. No.: 177,130

[22] Filed: Jan. 4, 1994

[51] Int. Cl.$^6$ .................................................. C02F 1/46
[52] U.S. Cl. ........................... 204/150; 204/186; 204/188; 204/248; 204/302
[58] Field of Search ................................ 204/150, 186, 204/188, 248, 302

[56] References Cited

U.S. PATENT DOCUMENTS

| | | | |
|---|---|---|---|
| 672,230 | 4/1901 | Lacomme | 204/149 |
| 2,451,065 | 10/1948 | Butler | 204/248 |
| 3,026,259 | 3/1962 | Phillips | 204/249 |
| 3,342,712 | 9/1967 | O'Keefe, Sr. | 204/148 |
| 3,379,633 | 4/1968 | Green | 204/248 |
| 3,392,102 | 7/1968 | Koch | 204/249 |
| 3,451,913 | 6/1969 | LaBorde et al. | 204/248 |
| 3,686,092 | 8/1972 | Stehlin | 204/197 |
| 3,801,492 | 4/1974 | King | 204/302 |
| 3,871,989 | 3/1975 | King | 204/299 |
| 3,873,438 | 3/1975 | Anderson et al. | 204/268 |
| 4,073,712 | 2/1978 | Means et al. | 204/186 |
| 4,325,798 | 4/1982 | Mack | 204/248 |
| 4,378,276 | 3/1983 | Liggett et al. | 204/149 |
| 4,749,457 | 6/1988 | Yasuda et al. | 204/150 |
| 4,752,364 | 6/1988 | Dhooge | 204/151 |
| 4,902,391 | 2/1990 | Ibbott | 204/150 |
| 5,102,515 | 4/1992 | Ibbott | 204/150 |
| 5,234,555 | 8/1993 | Ibbott | 204/150 |

FOREIGN PATENT DOCUMENTS

| | | |
|---|---|---|
| 276254 | 8/1927 | United Kingdom . |
| 463794 | 3/1937 | United Kingdom . |
| 1288552 | 9/1972 | United Kingdom . |

OTHER PUBLICATIONS

H. P. Godard, Editorial "WatchOut for Wondrous Water Treatment Witchcraft", Materials Performance Apr. 1974.
Eliassen et al., "So-Called Electrical and Catalytic Treatment of Water for Boilers", *J. Am. Water Works Assn.*, Jul. 1952, 576–582.
Eliassen et al., "Experimental Performance of 'Miracle'Water Conditioners", *J. Am. Water Works Assn.*, Oct. 1958, pp. 1371–1385.
Federal Trade Commission Decision on 'Elvis Water Condition' Claims, Jun. 1959, pp. 708–710.
*The New Encyclopaedia Britannica*, Encyclopaedia Britannica Inc., 15th Edition, 1986, pp. 260–265. No Month.
Welder et al., "Practical Performance of Water–Conditioning Gadgets", *Industrial and Engineering Chemistry*, vol. 46, No. 5, 1953, pp. 954–960. No Month.
G. V. James, "Water Treatment", Third Edition, The Technical Press Ltd., London, 1966, pp. 164–167. No Month.
E. Nordell, "Water Treatment for Industrial and Other Uses", Second Edition, Reinhold Publishing Corp., New York, 1961, pp. 268–272.
H. P. Godard, Editorial "Watch Out for Wondrous Water Treatment Witchcraft", Materials Performance, Apr. 1974, p. 9.

*Primary Examiner*—John Niebling
*Assistant Examiner*—Arun S. Phasge
*Attorney, Agent, or Firm*—Wenderoth, Lind & Ponack

[57] ABSTRACT

In a method and apparatus for treating fluid flowing through piping so as to prevent the deposition of a calcium and magnesium scale on the piping, for example, positive and negative electrodes of electrically conductive materials having different electrochemical potentials are provided on the outer peripheral surface of an electrically insulative tubular member through which the fluid flows. Because the electrodes are disposed out of physical contact with the flowing fluid, the electrodes do not pose an obstacle to the fluid flow nor are the electrodes abraded or worn by particles that may be entrained in the fluid. Nonetheless, an electroconductive connection between the electrodes is established through the body of fluid by a capacitive effect so that the fluid is ionized.

5 Claims, 4 Drawing Sheets

SELF-ENERGIZING FLUID TREATMENT APPARATUS EMPLOYING EXTERNAL ELECTRODES

BACKGROUND OF THE INVENTION

1. Field of the Invention

The present invention relates to a method and apparatus for treating electrically conductive fluid, that is fluid having some electroconductive capability. More particularly, the present invention relates to a self-generating apparatus using electrodes located externally of a fluid passageway to ionize the fluid as the fluid passes through the passageway.

2. Description of the Related Art

Self-energizing fluid treatment devices which employ electrodes of electrically conductive materials having different electrochemical potentials are known. The term self-energizing refers to the fact that these devices employ no external power source. In these devices, the fluid to be treated flows over the electrodes whereby an electroconductive connection between the electrodes is established through the body of flowing fluid. In some of these devices, the electrodes pose a significant obstruction to the fluid flow. Further, because the electrodes are exposed to the fluid flow, the electrodes are abraded and/or worn to a considerable extent particularly when the fluid entrains non-soluble particles. Still further, depending on the nature of the fluid, the electrically conductive materials of the electrodes may corrode due to electrolysis.

One of the known self-generating devices having electrodes of different electrochemical potentials is disclosed in U.S. Pat. No. 5,234,555. In this device, the electrically conductive materials of the electrodes are provided with an electrically insulative coating to isolate the fluid from the electrically conductive materials of the electrodes. Several years of research by the present inventor had revealed that an ideal condition for fluid treatment is a voltage potential only condition between the electrodes. The inhibition of current flow through the fluid to an absolute minimum is necessary in establishing this condition. The coating of the electrode(s) with an electrically insulative material as disclosed in U.S. Pat. No. 5,234,555 to be an efficient and reliable means to achieve the above-mentioned voltage potential only condition.

The plastics used as the coatings of the electrodes are known to be imperfect as electric insulators and accordingly, electrons will always pass through the plastic however small such leakage may be. Even a minimal amount of electrons is sufficient for a voltage potential to develop between electrodes of different electrochemical potentials. Again, research by the present inventor has shown that as the current flow through the fluid is reduced and the voltage potential only condition is maintained, the treatment of the fluid becomes more efficient.

However, the coated electrodes are still disposed within the line of fluid flow. Thus, the device suffers from the problems described above. Specifically, the plastic coating is worn and abraded away, particularly by industrial water in which solid particles are suspended, thereby exposing the electrode to the fluid with the resultant loss in efficiency. This problem cannot be effectively overcome by increasing the thickness of the coating because this countermeasure in turn gives rise to problems such as reducing the flow area and increasing manufacturing costs.

Although it is known in the prior art to keep the electrodes out of contact with the fluid flow, the electrodes are nonetheless connected to an external electric power supply. In this case, the electrically conductive materials of the electrodes do not need to have different electrochemical potentials.

SUMMARY OF THE INVENTION

An object of the invention is to overcome the above-described problems by providing a self-generating fluid treatment apparatus and method in which the electrodes do not obstruct the fluid flow and are out of physical contact with the fluid so as to not to become worn or corroded by the fluid.

To achieve these objects, the present invention provides a method and apparatus for treating fluid in which positive and negative electrodes are disposed on the outer peripheral surface of a tubular member of electrically insulative material, the fluid to be treated flowing only through the interior of the tubular member so as to be out of physical contact with the electrodes. The tubular member can have a thick wall and define a smooth and straight flow passage to prevent the fluid from becoming turbulent. The effects of abrasion on the apparatus can thus be minimized with a corresponding increase in the working life of the apparatus.

The electrically conductive materials of the positive and negative electrodes have different electrochemical potentials. For instance, the electrically conductive material of the positive electrode may be carbon and that of the negative electrode aluminum.

The electrically conductive materials of the positive and negative electrodes are disposed proximate each other on the outer peripheral surface of the tubular member of electrically insulative (plastic) material. The electrodes may either be isolated from one another (open circuit condition), electrically conductively connected by an electrical resistor, or electrically conductively connected to one another by being in direct physical contact. The circuit condition will be selected based on the particular application or operating requirements. Further, the order in which the electrodes are disposed in the axial direction of the tubular member, i.e. the flow direction, will also be selected based on the particular type of treatment to which the present invention is applied.

BRIEF DESCRIPTION OF THE DRAWINGS

These and other objects, features and advantages of the present invention will become more apparent to those of ordinary skill in the art reviewing the detailed description below made with reference to the accompanying drawings, in which.

DETAILED DESCRIPTION OF THE PREFERRED EMBODIMENTS

Figure 1:
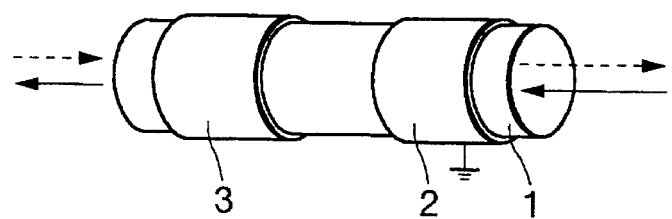
FIG. 1 is a perspective view of an essential part of a first embodiment of an apparatus for treating electrically conductive fluid according to the present invention.

FIG. 1 shows an essential part of the present invention in which reference numeral 1 designates a tubular member of electrically insulative material (plastic), 2 a positive electrode of electrically conductive material and 3 a negative electrode of electrically conductive material, the electrically conductive materials of the positive 2 and negative 3 electrodes having different electrochemical potentials.

The fluid to be treated will flow through only the fluid passageway defined by the inner peripheral surface of the tubular member 1 in either direction shown by the arrows. That is, the solid arrow shows the fluid flowing through the tubular member 1 first past the positive electrode 2 and then past the negative electrode 3. Conversely, the dashed dash line arrow shows the fluid flowing in the other direction, negative electrode 3 to positive electrode 2. As mentioned above, the direction of fluid flow relative to the positive 2 and negative 3 electrodes will be selected based upon the particular treatment to be carried out.

Figure 2:
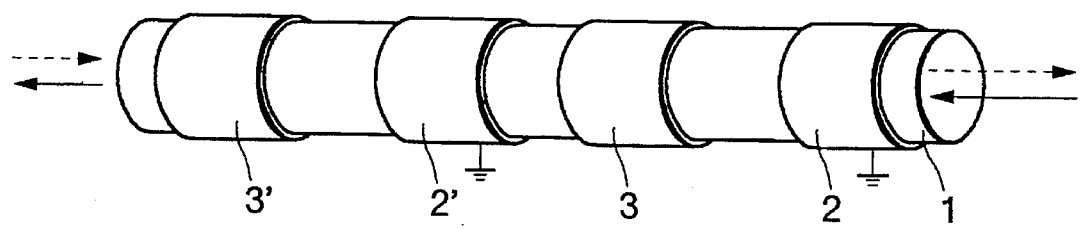
FIG. 2 is a perspective view of an essential part of a second embodiment of an apparatus for treating electrically conductive fluid according to the present invention.

In the embodiment of FIG. 2, a plurality of the positive and negative electrodes are disposed on the outer peripheral surface of the tubular member 1. The positive 2, 2' and negative 3, 3' electrodes are disposed alternately in the axial direction of the tubular member 1, i.e. in the fluid flow direction. Again, the arrows show that this arrangement has applications in which the fluid may flow in either direction.

Figure 3:
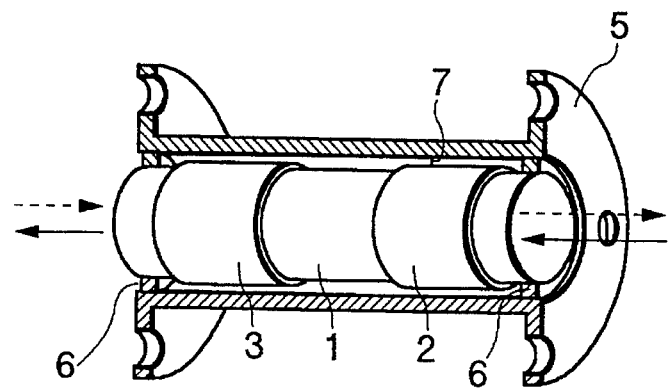
FIG. 3 is a perspective view, partially in section, of apparatus for treating electrically conductive fluid according to the present invention, employing the essential part shown in FIG. 1.

FIG. 3 shows an embodiment which can be readily placed in-line with piping through which the fluid to be treated is flowing. In this figure, reference numeral 5 designates a pipe having flanges at its opposite ends. The flanges have bolt holes therethrough through which bolts can be inserted to secure the apparatus to corresponding flanges in the fluid piping. Reference numeral 6 designates sealing members which form a seal between the outer peripheral surface of the tubular member 1 and the inner peripheral surface of the pipe 5. In other words, the sealing members 6 seal the positive electrode 2 and the negative electrode 3 from the openings of the pipe 5 at the opposite ends thereof such that fluid flowing through the piping to which the apparatus shown in the figure is connected will flow through the apparatus only within the fluid passageway defined by the inner peripheral surface of the tubular member 1. Reference numeral 7 designates a ground wire connecting the positive electrode 2 to the pipe such that the positive electrode 2 is grounded via the pipe 5. The fluid passageway will have a diameter at least equal to that of the fluid piping so that the tubular member itself will not obstruct the fluid flow.

The grounding of the positive electrode(s) 2 is not always necessary. It has been found that when the positive electrode is small, it quickly becomes saturated with electrons resulting in a decline in the efficiency of the apparatus. The grounding of the positive electrode drains the electrons and thus allows a small unit to be efficient. However, on larger units where the positive electrode(s) is correspondingly large, the grounding of the positive electrode(s) can be omitted. In this case, the larger surface area of the positive electrode(s) allows for a sufficient amount of electrons to dissipate whereby the performance level is maintained.

Figure 4:
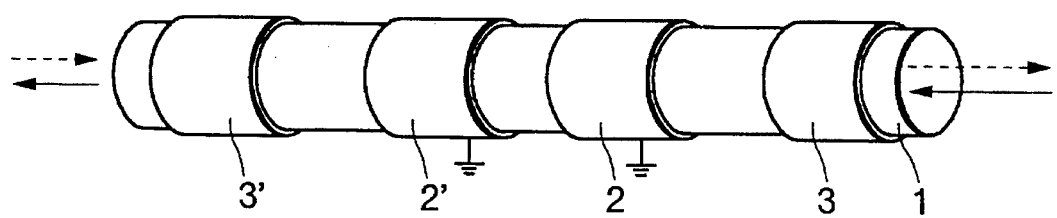
FIG. 4 is a perspective view of a modified form of the embodiment shown in FIG. 2.

As mentioned above, in the embodiment of FIG. 2, the positive and negative electrodes are alternately disposed. The merits of specifying the sequence in which the fluid passes the electrodes has been made the subject of copending application U.S. Ser. No. 07/916,254 which is hereby incorporated by reference. However, the present invention is not limited to such an arrangement. The sequence of the electrodes on the outer peripheral surface as viewed in the axial direction of the tubular member could be negative electrode, positive electrode, positive electrode, negative electrode as shown in the embodiment of FIG. 4. Through experiments, the inventor found that the arrangement of the electrodes in various orders could provide various useful effects and suitable performance under extremely difficult or unusual operating conditions such as when the fluid was to be heated above 60° C. by an electric heating method after having passed through the apparatus, particularly when the fluid is heated with an immersion type heater.

The present inventor confirmed the effectiveness and efficiency of the present invention by carrying out the following tests.

First, the effectiveness of the present invention was tested as follows.

Two equal samples were taken from a body of fluid having an initial electroconductivity of 249 µS/cm. One of these samples was passed through the tubular member of the embodiment of FIG. 2 while the other sample remained untreated.

Both samples were placed in a common hot water bath and allowed to evaporate until the samples achieves a predetermined concentration of five times their initial concentration. The electroconductivity of the concentrated sample of fluid which was not treated was measured and determined to be 928 µS/cm. On the other hand, the electroconductivity of the concentrated sample of fluid which had been passed through the embodiment of FIG. 2 according to the present invention was 968 µS/cm. The water treated according to the present invention thus has a residual electroconductivity level significantly higher than that of the untreated water. This shows that the present invention reduced the precipitation by a total of 40 µS/cm.

Next, the efficiency of the present invention was tested by comparing a device according to the present invention to the device disclosed in U.S. Pat. No. 4,902,391. The device based on the disclosure of U.S. Pat. No. 4,902,391 employed an aluminum negative electrode and a carbon positive electrode electrically isolated from one another. A sample from the same body of fluid mentioned above was taken and passed through the device constructed according to U.S. Pat. No. 4,902,391 whereby the fluid came into contact with the positive and negative electrodes. The treated water was then also placed in the same hot water bath mentioned above and evaporated until it had attained a concentration of five times that the original sample of water.

The electroconductivity of the concentrated sample, having been treated by the device constructed according to U.S. Pat. No. 4,902,391, was measured. The measurement revealed an electroconductivity of 955 µS/cm. This value is less than the value of 968 µS/cm obtained by measuring the electroconductivity of the fluid treated according to the present invention. The present invention is thus more efficient than the prior device disclosed in U.S. Pat. No. 4,902,391.

Specifically, because the present invention exhibited a reduced loss of electroconductivity of 40 µS/cm whereas a corresponding value of the device constructed according to U.S. Pat. No. 4,902,391 was only 13 µS/cm, the present invention is 48% more efficient than the invention of U.S. Pat. No. 4,902,391.

Figure 5:
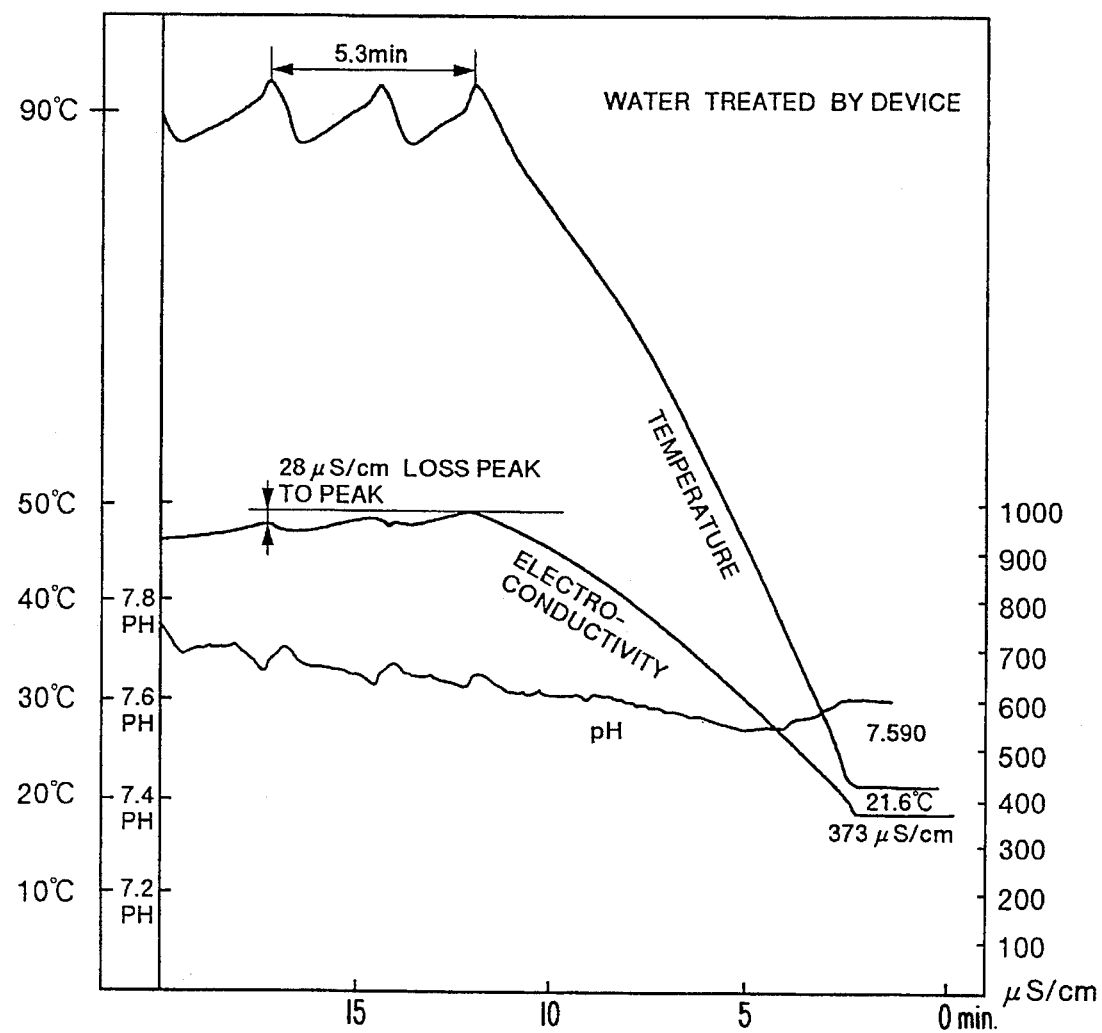
FIG. 5 is a chart of a test carried out on a sample of water treated by the embodiment of FIG. 4 according to the invention.
Figure 6:
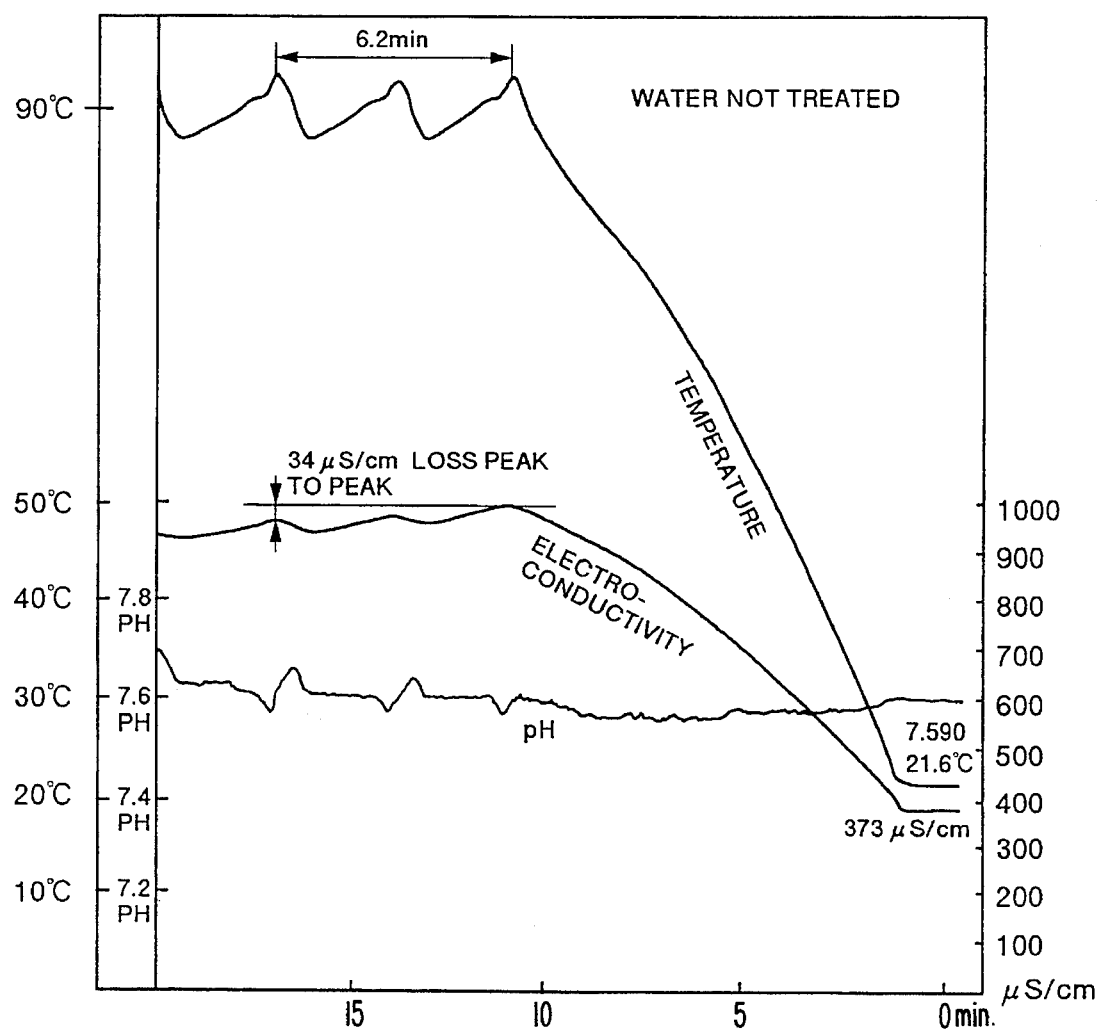
FIG. 6 is a chart of an identical test carried out on an untreated sample of the water.

A second test of the effectiveness of the present invention was carried out and the results of this test are illustrated in FIGS. 5 and 6.

The water used in these tests had an electroconductivity of 372 μS/cm at 21.6° C. (400 μS/cm at 25°). Three liters of this water were used as an untreated sample and three liters were passed through the embodiment of FIG. 4 according to the present invention and poured into a container.

Each three liter sample, untreated and treated by the embodiment of FIG. 4, was heated in a small stainless steel boiler provided with an immersion type electric heating element. The boiler was also fitted with a block of 15 stainless steel pipes extending vertically over a length of one meter. The pipes each had a bore of 10 mm and served as condenser tubes to condense the steam produced when heating the samples and allow the condensate to drain back into the boiler. In this way, the same volume of water was maintained to thereby maintain constant conditions when recording pH, electroconductivity and temperature of the samples so in turn eliminate discrepancies in the test conditions due to unequal losses of the water by evaporation.

First, the sample of untreated water was subjected to a heating cycle in the boiler in which the temperature was raised to 93° C. and then allowed to cool to 87° C. three consecutive times. As mentioned above, the pH, electroconductivity and temperature was measured during the heating cycle. Afterwards, the untreated sample was removed from the boiler which was then thoroughly washed to remove all traces of precipitate.

Then, the sample of water treated with the embodiment of FIG. 4 according to the present invention was placed in the same boiler and subjected to the same heating cycle. About 20 minutes was allowed to elapse between the time the sample has passed through the device according to the present invention and the electric heater was turned on in order to allow time for the pH reading to stabilize.

Comparing the charts of the two figures, the pH line in the chart of FIG. 5 maintains a higher level (alkalinity) than the pH line of the chart of FIG. 6 which falls off indicating a more acid condition.

The electroconductivity line of the chart of FIG. 5 also maintains a higher level than that of the chart of FIG. 6 thereby indicating reduced precipitation of the dissolved content of the water when treated with the device of FIG. 4. In the chart of FIG. 5, the electroconductivity line shows a loss of 28 μS/cm below that of the first peak whereas the electroconductivity line of the chart of FIG. 6 shows a loss of 34 μS/cm below that of the first peak. This difference in electroconductivity shows that under identical conditions the device of the present invention caused a reduced precipitation of the dissolved content of the water by 6 μS/cm. Although this might seem to be relatively small, the inventor noticed other positive factors presumably resulting from the ionization of the fluid treated by the present invention. For example, the present inventor observed that the scale formed on the immersion type heating element was much less when the water treated with the present invention was heated than when the untreated sample was heated. Further, the scale was very soft and easily washed off whereas the scale formed when the untreated water was heated was heavy, much harder in nature, and difficult to clean off the surface of the heating element.

It should also be obvious that heating a small test sample of three liters from ambient temperature to 93° C. imposes conditions which are much more severe than those imposed in most actual environments in which the present invention would be used. Thus, although the above tests indicated a relatively small improvement corresponding to 6 μS/cm, there would in fact be a much greater reduced precipitation under actual operating conditions. This is particularly true noting that the tests were conducted in a short time in the laboratory whereas the present invention would remain in continuous operation in fluid piping for several years. The long term effect of even small changes shown by short term testing would provide a very effective treatment of the fluid (in the case of preventing the deposition of calcium and magnesium scale).

Finally, with respect to the above-described tests, it is noted that the temperature line in the chart of FIG. 5 has a cycle time from peak 1 to peak 3 which is shorter by approximately 1 minute than the same cycle of the temperature line in the chart of FIG. 6.

The above tests illustrate the effectiveness and efficiency of the present invention without fully explaining the complexities under which the present invention operates. Various factors have been considered by the inventor in confirming the operating principal of the invention. For instance, the inventor realizes that electric charges are generated due to friction as the fluid flows along the inner peripheral surface of the tubular member 1. There is also the "work function" or "Fermi energy" of the electrodes to consider. The inventor supposes that these energies could act in combination with the electroconductive connection between the electrodes established by the fluid to create a resonant effect within the fluid.

Although the present invention has been fully described in connection with preferred embodiments thereof with reference to the accompanying drawings, it is to be noted that numerous changes and modifications will become apparent to those of ordinary skill in the art. For instance, although the present invention has been described above in the context of treating water to inhibit the development of calcium and/or magnesium scale within a water containment system, the present invention is not so limited and can be used in the treatment of other fluids. For example, because the electrodes are out of physical contact with the fluid, even corrosive fluids such as acids, alkali, etc. may be treated by practicing the present invention. For similar reasons, the present invention is well-suited to treat beverages, pulp foodstuffs, medical fluids, etc. which are to be kept free of contamination. The present invention may also be applied to treating solvents, oils, fuels (to stimulate combustion) or to facilitate the mixing of two different fluids. Accordingly, such changes and modifications are seen to be within the true spirit and scope of the present invention as defined by the appended claims.

What is claimed is:

1. Apparatus for treating electrically conductive fluid, said apparatus comprising:

a tubular member of electrically insulative material having an inner peripheral surface defining a fluid passageway and an outer peripheral surface; and self-generating means for producing an electric potential without an external power supply, said self-generating means including a positive electrode and a negative electrode, said positive electrode being of electrically conductive material and disposed on the outer peripheral surface of said tubular member, said negative electrode being of electrically conductive material and disposed on the outer peripheral surface of said tubular member, and the electrically conductive materials of said electrodes having different electrochemical potentials such that when electrically conductive fluid to be treated in the apparatus flows through said fluid passageway, an electroconductive connection between said electrodes is established through the body of fluid.

2. Apparatus as claimed in claim 1, and further comprising a pipe having opposite ends and flanges at said opposite ends, said tubular member being disposed within said pipe, and said electrodes being sealed from openings of said pipe at the opposite ends thereof.

3. Apparatus as claimed in claim 2, and further comprising a ground wire connecting said positive electrode to said pipe.

4. Apparatus as claimed in claim 1, wherein the electrically conductive material of said positive electrode is carbon, and the electrically conductive material of said negative electrode is aluminum.

5. A method of treating electrically conductive fluid, said method comprising:

providing a tubular member of electrically insulative material, having an inner peripheral surface defining a fluid passageway and an outer peripheral surface, in-line with fluid piping in such a manner that fluid flowing through said piping will flow past said tubular member through only said fluid passageway thereof; and producing an electrical potential without the use of any external power source by providing a positive electrode of electrically conductive material on the outer peripheral surface of the tubular member, providing a negative electrode of electrically conductive material on the outer peripheral surface of the tubular member, the electrically conductive materials of the electrodes having different electrochemical potentials, and causing a body of electrically conductive fluid to flow through the piping and thus only within the tubular member of electrically insulative material such that an electroconductive connection between the electrodes is established through the body of fluid.

\* \* \* \* \*